United States Patent
Ignaczak et al.

(10) Patent No.: US 9,359,009 B2
(45) Date of Patent: Jun. 7, 2016

(54) OBJECT DETECTION DURING VEHICLE PARKING

(71) Applicant: Ford Global Technologies, LLC, Dearborn, MI (US)

(72) Inventors: Brad Ignaczak, Canton, MI (US); Maher Ghneim, Livonia, MI (US); Andrew John Murray, Colchester (GB); Tania Vazquez, Benito Juarez (MX)

(73) Assignee: Ford Global Technologies, LLC, Dearborn, MI (US)

( * ) Notice: Subject to any disclaimer, the term of this patent is extended or adjusted under 35 U.S.C. 154(b) by 140 days.

(21) Appl. No.: 14/309,081

(22) Filed: Jun. 19, 2014

(65) Prior Publication Data

US 2015/0266509 A1     Sep. 24, 2015

Related U.S. Application Data

(60) Provisional application No. 61/969,109, filed on Mar. 22, 2014.

(51) Int. Cl.
| | |
|---|---|
| *G06F 19/00* | (2011.01) |
| *B62D 15/02* | (2006.01) |
| *B60W 50/14* | (2012.01) |
| *B60W 30/095* | (2012.01) |

(52) U.S. Cl.
CPC .............. *B62D 15/027* (2013.01); *B60W 50/14* (2013.01); *B60W 30/0956* (2013.01); *B60W 2050/146* (2013.01); *B60W 2420/42* (2013.01); *B60W 2420/54* (2013.01)

(58) Field of Classification Search
None
See application file for complete search history.

(56) References Cited

U.S. PATENT DOCUMENTS

| | | | |
|---|---|---|---|
| 8,514,282 B2 | 8/2013 | Imanishi et al. | |
| 2003/0090570 A1 | 5/2003 | Takagi et al. | |
| 2010/0060487 A1 | 3/2010 | Augst | |
| 2012/0087546 A1* | 4/2012 | Focke | B60R 1/00 |
| | | | 382/104 |
| 2014/0002253 A1 | 1/2014 | Yilmaz et al. | |
| 2014/0347485 A1* | 11/2014 | Zhang | B60R 11/04 |
| | | | 348/148 |
| 2015/0084755 A1* | 3/2015 | Chen | G08G 1/16 |
| | | | 340/435 |

FOREIGN PATENT DOCUMENTS

| | | |
|---|---|---|
| DE | 102009032542 | 1/2011 |
| DE | 102012201929 A1 | 8/2013 |
| JP | 200498981 | 4/2004 |
| JP | 2004098918 | 4/2004 |
| JP | 2006303858 A | 11/2006 |
| JP | 2007142765 A | 6/2007 |
| JP | 2010205078 | 10/2007 |
| KR | 100771276 | 10/2007 |
| KR | 20130047357 | 5/2012 |
| KR | 20130047357 A | 5/2013 |

OTHER PUBLICATIONS

Gallo, et al. "Robust Curb and Ramp Detection for Safe Parking Using the Canesta TOF Camera", CiteSeer$^X_\beta$, http://citeseerx.ist.psu.edu/viewdoc/summary?doi=10.1.1.141.231, 2 pages.

* cited by examiner

*Primary Examiner* — Adam Alharbi
(74) *Attorney, Agent, or Firm* — Frank MacKenzie; Bejin Bieneman PLC

(57) ABSTRACT

A computer in a vehicle is programmed to collect data related to an object; use the data to generate a virtual map of the object with respect to the vehicle; and provide output based on the virtual map that indicates a risk of the parking operation.

16 Claims, 12 Drawing Sheets

OBJECT DETECTION DURING VEHICLE PARKING

RELATED APPLICATION

This application claims priority to provisional U.S. patent application Ser. No. 61/969,109, filed Mar. 22, 2014, entitled "OBJECT DETECTION DURING VEHICLE PARKING," the contents of which are hereby incorporated herein by reference in their entirety.

BACKGROUND

Various kinds of obstacles pose risks to a vehicle during a parking operation. Such obstacles include, for example, other vehicles, pedestrians, and curbs at a side of a road on which a parking operation is being performed. Unfortunately, mechanisms are presently lacking for detecting, and tracking relative to a vehicle during a parking maneuver, curbs.

DRAWINGS

DETAILED DESCRIPTION

System Overview

Figure 1:
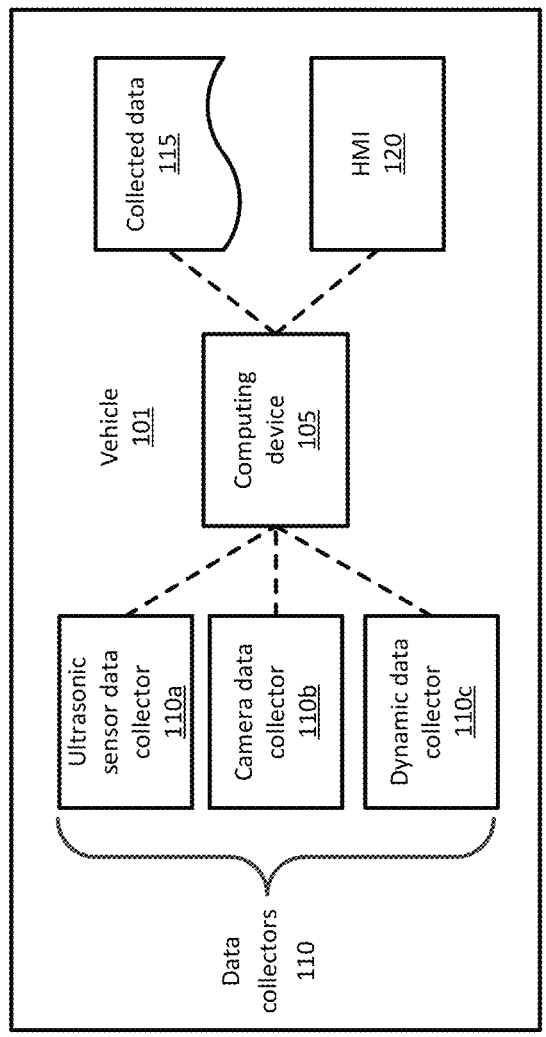
FIG. 1 is a block diagram of an exemplary vehicle equipped for curb detection and monitoring.

FIG. 1 is a block diagram of an exemplary vehicle 101 equipped for curb detection and monitoring. The vehicle 101 generally includes one or more sensor data collectors 110, in particular ultrasonic sensors 110a and/or video cameras 110b, that may be used to provide data 115 to a vehicle computer 105 during a vehicle 101 parking operation. Advantageously, the computer 105 may be configured to use the data 115 to detect a curb during a parking operation, and moreover may be configured to evaluate a risk to the vehicle 101 and/or one or more components thereof, posed by the curb during the parking operation. Yet further, the computer 105 may be configured to provide an alert via a human machine interface (HMI) 120 in the vehicle 101. And even further, the computer 105 may be configured to provide an instruction to a controller in the vehicle 101 to mitigate the risk posed by the curb, e.g., to a steering controller to limit a steering angle of the vehicle 101, to a brake controller to apply brakes, e.g., autobrake functionality, etc.

Exemplary System Elements

As stated above, a vehicle 101 includes a vehicle computer 105. The vehicle 101 is generally a land-based vehicle having three or more wheels, e.g., a passenger car, light truck, etc. The computer 105 generally includes a processor and a memory, the memory including one or more forms of computer-readable media, and storing instructions executable by the processor for performing various operations, including as disclosed herein. Further, the computer 105 may include and/or be communicatively coupled to more than one computing device, e.g., controllers or the like included in the vehicle 101 for monitoring and/or controlling various vehicle components, e.g., an engine control unit, transmission control unit, etc. The computer 105 is generally configured for communications on a controller area network (CAN) bus or the like. The computer 105 may also have a connection to an onboard diagnostics connector (OBD-II).

Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 110. Alternatively or additionally, in cases where the computer 105 actually comprises multiple devices, the CAN bus or the like may be used for communications between devices represented as the computer 105 in this disclosure. In addition, the computer 105 may be configured for communicating with other devices via various wired and/or wireless networking technologies, e.g., cellular, Bluetooth, a universal serial bus (USB), wired and/or wireless packet networks, etc.

Data collectors 110 may include a variety of devices. For example, as illustrated in FIG. 1, data collectors 110 can include ultrasonic sensors 110a, cameras 110b, and/or data collectors 110c that collect dynamic vehicle 101 data, such as velocity, yaw rate, steering angle, etc. Further, the foregoing examples are not intended to be limiting; other types of data collectors 110 could be used to provide data 115 to the computer 105.

For example, various controllers in a vehicle may operate as data collectors 110 to provide data 115 via the CAN bus, e.g., data 115 relating to vehicle speed, acceleration, etc. As illustrated in FIG. 1, data collectors 110 may include one or more ultrasonic sensor data collectors 110a, one or more camera data collectors 110b, and/or one or more dynamic data collectors 110c, all discussed further below. Further, sensors or the like, global positioning system (GPS) equipment, etc., could be included in a vehicle and configured as data collectors 110 to provide data directly to the computer 105, e.g., via a wired or wireless connection. Further, sensors other than ultrasonic sensors 110a and other sensors mentioned herein are known and may be used for determining a vehicle 101 distance, closing speed, etc., with respect to other objects, such as a curb.

A memory of the computer 105 generally stores collected data 115. Collected data 115 may include a variety of data collected in a vehicle 101. Examples of collected data 115 are provided above, and in particular may include measurements of distances and/or angles, e.g., azimuth angles, of the vehicle 101 from a curb. Data 115 may additionally include data calculated therefrom in the computer 105. In general, collected data 115 may include any data that may be gathered by a collection device 110 and/or computed from such data.

The vehicle 101 generally includes a human machine interface (HMI) 120. In general, the HMI 120 is equipped to accept inputs for, and/or provide outputs from, the computer 105. For example, the vehicle 101 may include one or more of a display configured to provide a graphical user interface (GUI) or the like, an interactive voice response (IVR) system, audio output devices, mechanisms for providing haptic output, e.g., via a vehicle 101 steering wheel or seat, etc. Further, a user device, e.g., a portable computing device such as a tablet computer, a smart phone, or the like, may be used to provide some or all of an HMI 120 to a computer 105. For example, a user device could be connected to the computer 105 using technologies discussed above, e.g., USB, Bluetooth, etc., and could be used to accept inputs for and/or provide outputs from the computer 105.

Figure 2:
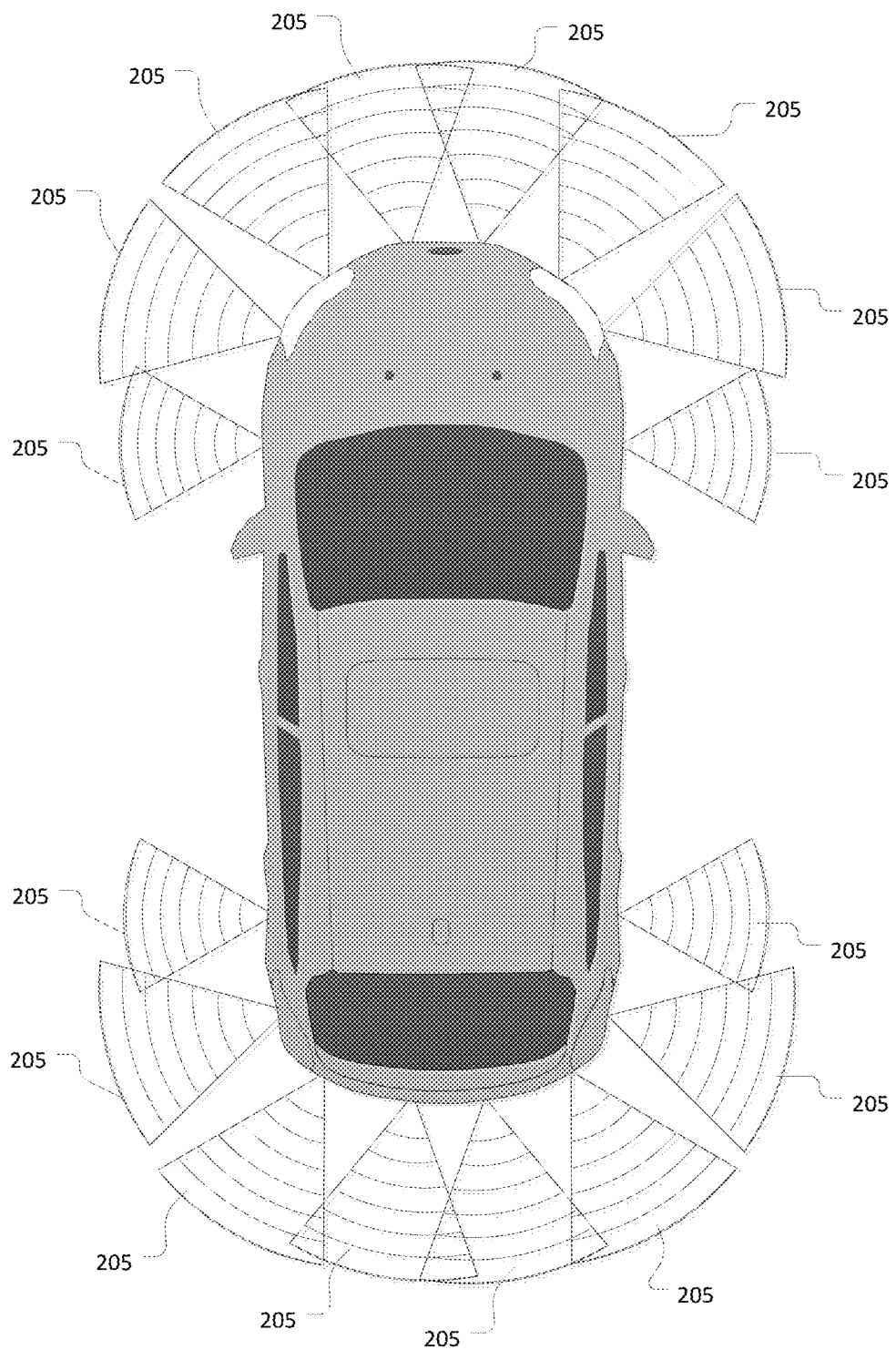
FIG. 2 is a top view of an exemplary vehicle equipped for curb detection and monitoring.
Figure 6:
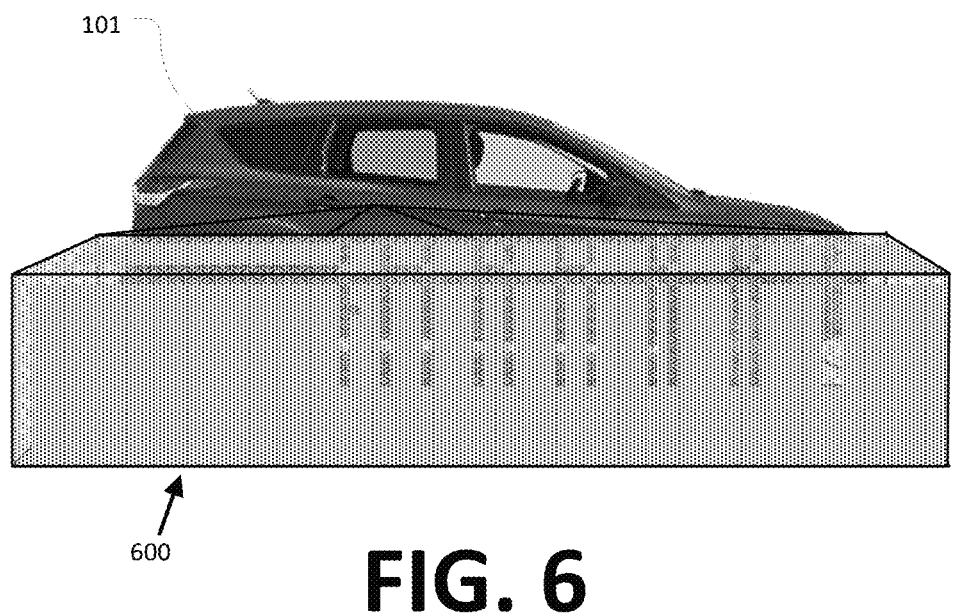
FIG. 6 is a side view of an exemplary vehicle equipped for curb detection and monitoring.
Figure 7:
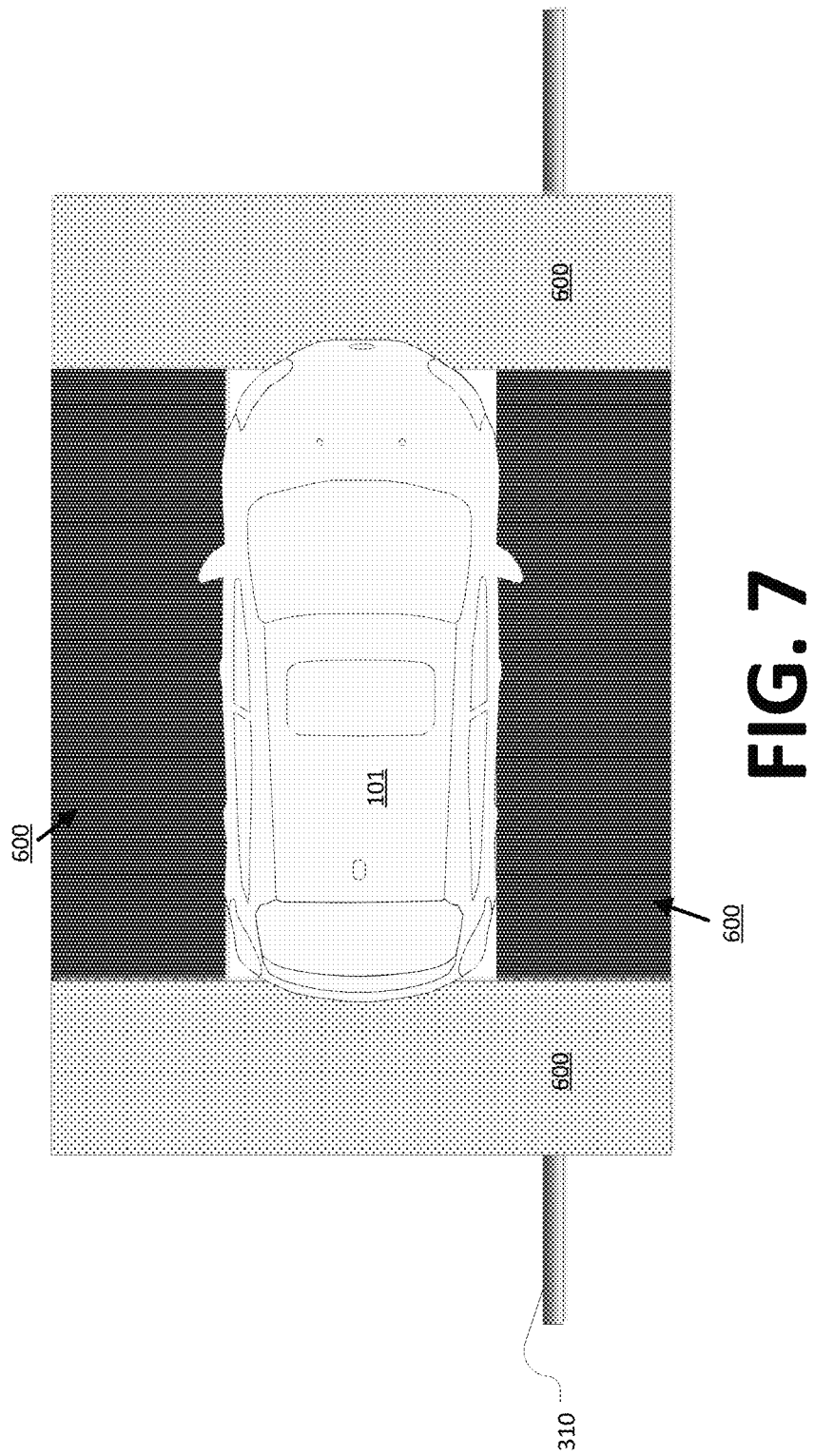
FIG. 7 is a top view of an exemplary vehicle equipped for curb detection and monitoring.

FIG. 2 is a top view of an exemplary vehicle 101 equipped for curb detection and monitoring. As explained above with respect to FIG. 1, the vehicle 101 may include a plurality of data collectors 110, including ultrasonic sensors 110a and/or video cameras 110b. Further, ultrasonic sensors 110a and/or video cameras 110b may be positioned on a vehicle 101 so as to detect a curb during a parking operation. Accordingly, FIGS. 2 and 3 each illustrate a plurality of ultrasonic detection fields 205, each of the fields 205 being associated with an ultrasonic sensor data collector 110a. FIGS. 6 and 7 each illustrate various image detection fields 600 provided by one or more cameras 110b in a vehicle 101. Data 115 from detection fields 205, 600 may be used, possibly in combination (e.g., data 115 from an ultrasonic sensor 110a could be used in combination with data 115 from a camera 110b), to detect a curb and provide information concerning risks related to a parking operation.

Although the ultrasonic sensor data collectors 110a are not visible in FIG. 2, their location may be inferred from locations of the ultrasonic detection fields 205. Further, a precise location on the vehicle 101 of a data collector 110, including an ultrasonic sensor, is not necessarily critical, so long as the vehicle 101 is equipped with data collectors 110, e.g., ultrasonic sensors, sufficient to cover an area around the vehicle 101 to detect obstacles including curbs. In any event, as can be seen in FIG. 2, ultrasonic sensor data collectors 110 on the vehicle 101 are generally configured to provide detection fields 205 providing information about a location of the vehicle 101 with respect to other objects, and in particular curbs.

Figure 3:
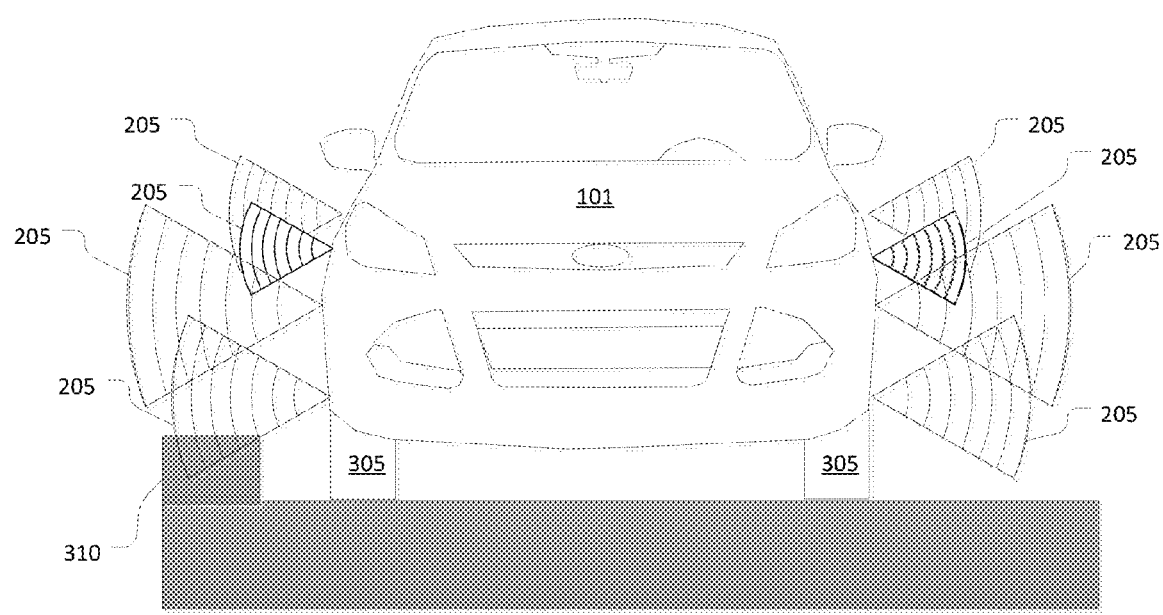
FIG. 3 is a front view of an exemplary vehicle equipped for curb detection and monitoring.

FIG. 3 is a front view of an exemplary vehicle 101 equipped for curb 310 detection and monitoring. As with FIG. 2, FIG. 3 illustrates a plurality of ultrasonic detection fields, each associated with an ultrasonic sensor data collector 110 (not visible in FIG. 3). As explained above with respect to FIG. 2, sensor data collectors 110 including ultrasonic sensors may be located with respect to a horizontal and/or vertical plane of the vehicle 101 so as to allow for detection of potential obstacles including a curb 310. Further, ultrasonic sensor data collectors 110 may be configured so that detection fields 205 provide information relevant to specific vehicle 101 components, such as wheels 305.

FIG. 6 is a side view of an exemplary vehicle 101 equipped for curb 310 detection and monitoring. FIG. 7 is a top view of an exemplary vehicle 101 equipped for curb 310 detection and monitoring. Turning first to FIG. 6, an image detection field 600 may be provided at a side of the vehicle 101. Similar detection fields 600, although not shown in FIG. 6 to preserve the clarity of that illustration, but as seen in FIG. 7, may likewise be provided in other areas adjacent to the vehicle 101, e.g., on another side, front, rear, etc. In general, one or more cameras 110b may be mounted in one or more locations on a vehicle 101 exterior, e.g., in a door, bumper, side panel, etc., or interior, e.g., facing forward from behind an interior rear-view mirror mounted on a vehicle 101 windshield. Accordingly, one or more cameras 110b, in addition, or as an alternative to, data 115 from one or more ultrasonic sensors 110a, may obtain image data 115 that may be analyzed, possibly in combination with ultrasonic data 115, to determine a distance of a curb 310 from a vehicle 101, an angle of impact of a wheel 305, etc.

Figure 4:
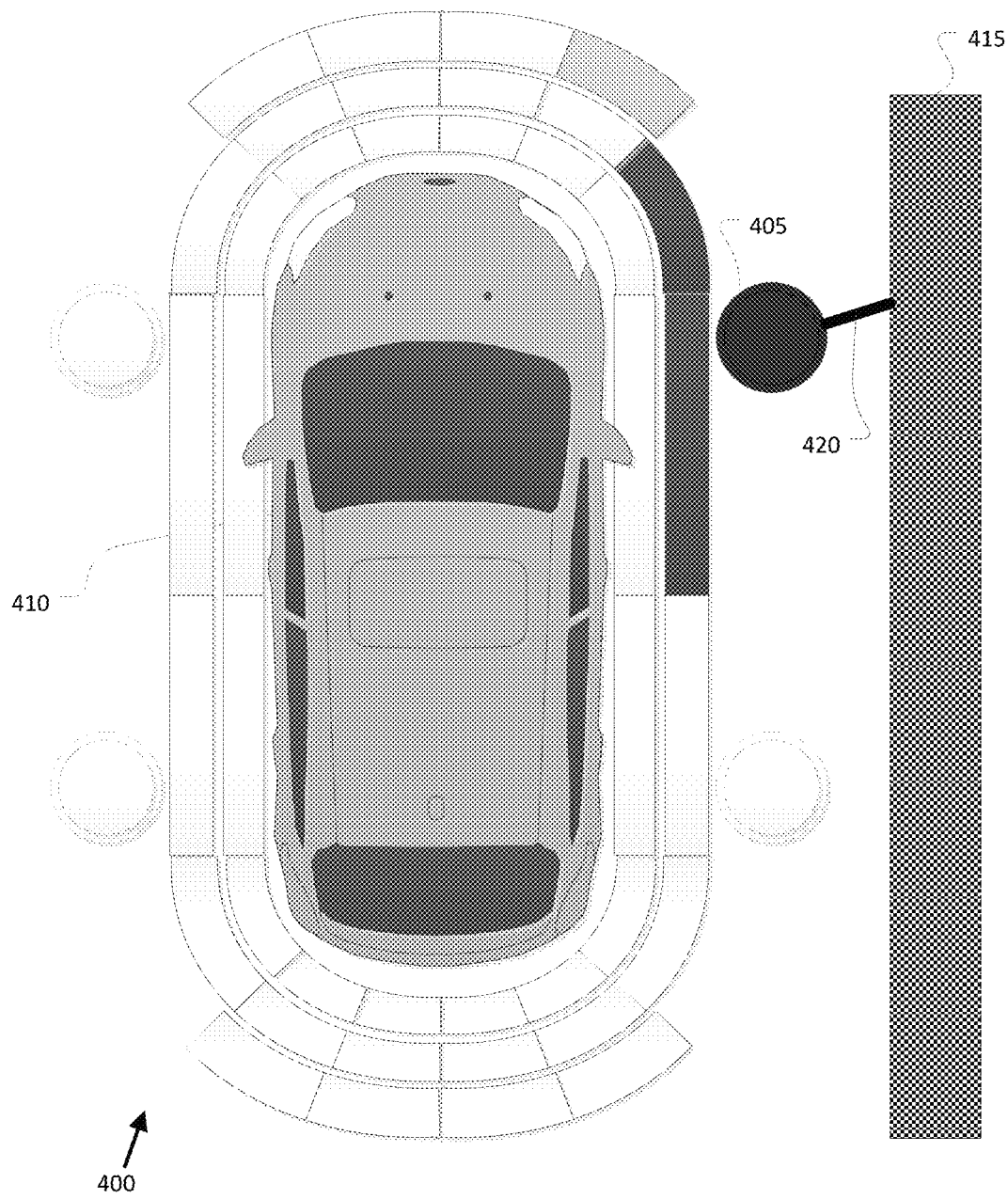
FIG. 4 illustrates an exemplary user display in a vehicle equipped for curb detection and monitoring.

FIG. 4 illustrates an exemplary user display 400 such as may be provided in an HMI 120 of a vehicle 101 equipped for curb detection and monitoring as disclosed herein. As seen in FIG. 4, the display 400, e.g., a display screen in a center console of a vehicle, a user device, etc., may include a vehicle representation 401, as well as representations of vehicle 101 components, e.g., wheel representations 405. The display 400 may further include indicators with respect to areas 410, which as seen in FIG. 4, may surround the vehicle representation 401, representing actual areas around the vehicle 101. Yet further, the display 400 may include a curb representation 415 relating to a curb 310 proximate, e.g., within one, two, or five meters of, the vehicle 101.

As further seen in FIG. 4, elements of the display 400 may be highlighted, e.g., using shading or the like, to indicate risks to the vehicle 101. For example, a wheel representation 405 may be shaded darker than other wheel representations 405, areas 410 may be shaded and/or color-coded, e.g., yellow for medium risk, red for high risk, etc., to indicate vehicle 101 components and/or regions around or proximate to the vehicle 101 posing risks based on current data 115. A curb representation 415, or portions thereof which a vehicle 101 is at greatest risk of dangerously impacting, could likewise be highlighted or shaded. For instance, in the exemplary display 400, a right front wheel representation 405, and area proximate thereto, are shown in darker shades, indicating a high degree of risk to the vehicle 101 in a parking operation.

Figure 8:
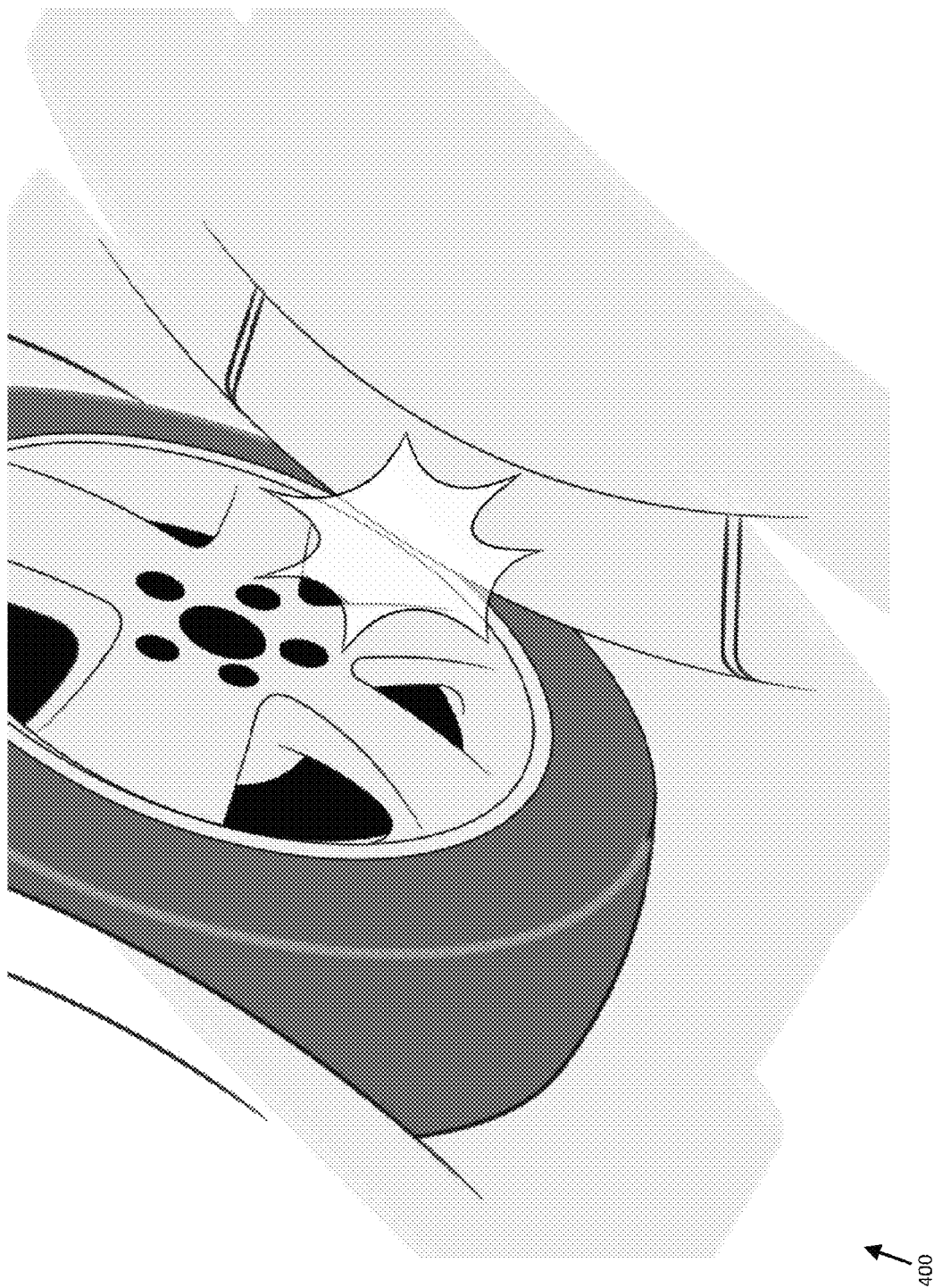
FIG. 8 illustrates a further exemplary user display in a vehicle equipped for curb detection and monitoring.
Figure 9:
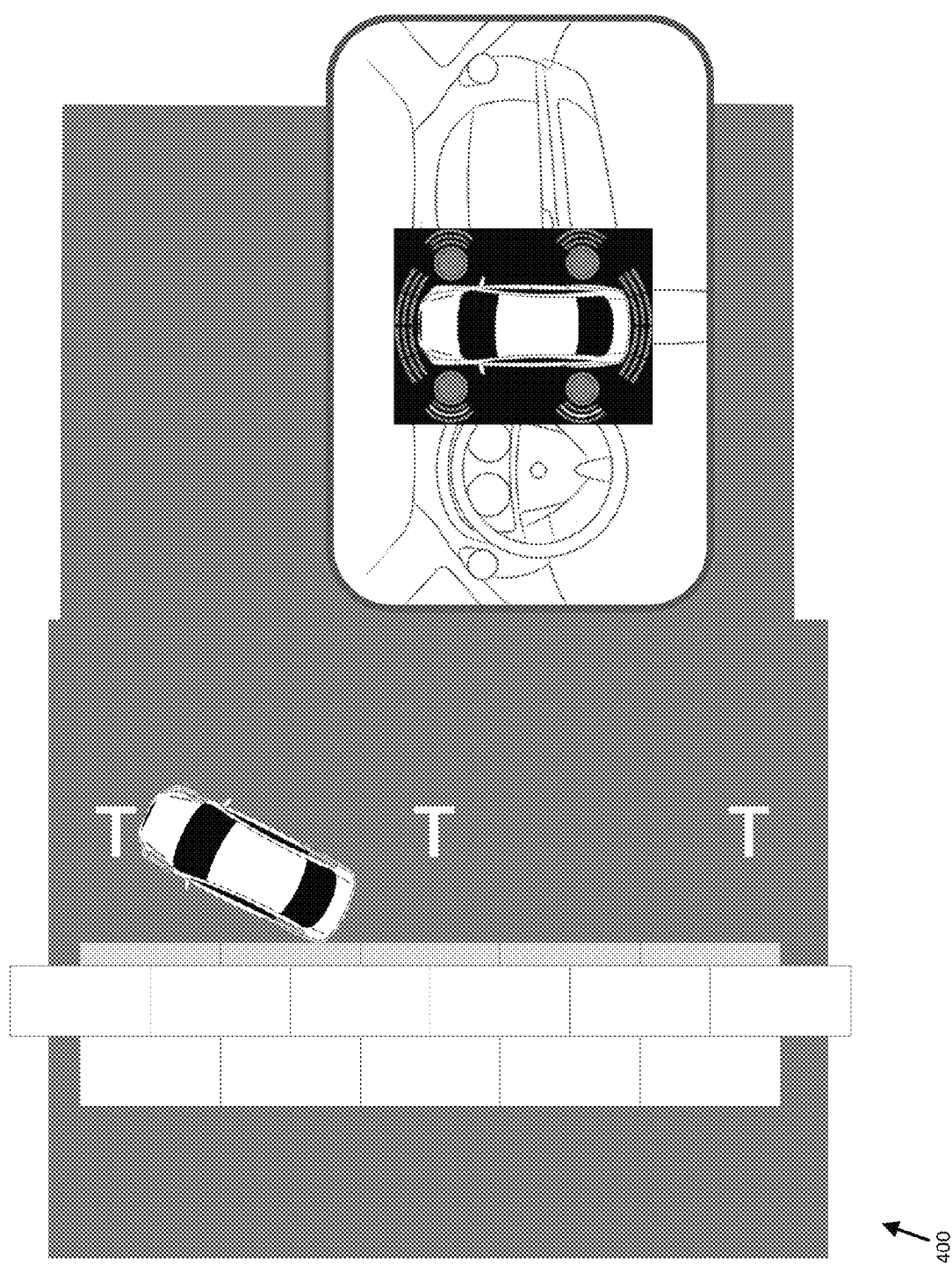
FIG. 9 illustrates a yet further exemplary user display in a vehicle equipped for curb detection and monitoring.

FIGS. 8 and 9 provide further possible examples of the display 400. For example, as seen in FIG. 8, some or all of a display 400 could depict a tire hitting a curb as a warning that a tire was in contact with, or about to contact, a curb. Further for example, as seen in FIG. 9, the display 400 could depict a proximity and/or orientation of a vehicle 101, and/or or components of a vehicle 101, such as tires to a curb or the like.

Exemplary Process Flows

Figure 5:
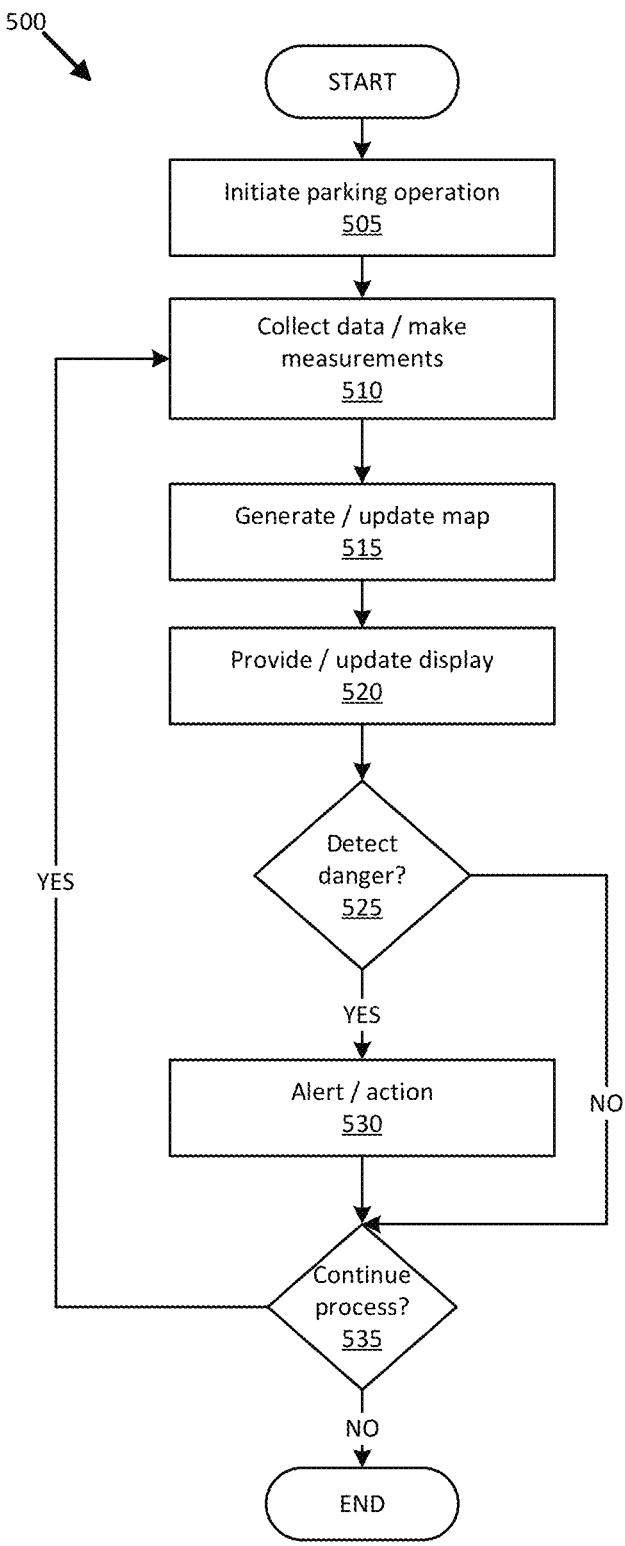
FIG. 5 is a diagram of an exemplary process for curb detection and monitoring.

FIG. 5 is a diagram of an exemplary process 500 for curb detection and monitoring. The process 500 begins in a block 505, in which a parking operation 505 is identified. The parking operation could be identified in a variety of ways, e.g., input could be received via the HMI 120 indicating that a manual parking operation is being initiated, global positioning system (GPS) data 115 could be used to indicate that a vehicle 101 was near a parking area, etc. Alternatively or additionally, data 115 indicating vehicle 101 velocity, steering angle, and/or other data 115, could indicate that a parking operation is underway or imminent.

For example, collected data 115 could be used in the computer 105 to indicate that a parking operation was being initiated, e.g., based on data 115 indicating that the vehicle 101 was moving at speeds appropriate for parking, was changing direction and/or steering angles in a manner appropriate for parking, etc. Alternatively or additionally, data 115 from a global positioning system (GPS) or the like could be used to determine that a vehicle is in a parking lot or garage, or to determine a proximity of a vehicle 101 to a curb 310, e.g., if a vehicle 101 was within a predetermined distance, e.g., one meter, two meters, five meters, etc. of a curb 310 and/or moving at or below a predetermined velocity, a parking operation could be identified.

Next, in a block 510, the computer 105 obtains and/or generates collected data 115. For example, collected data 115 may be obtained from one or more data collectors 110, as explained above. Further, collected data 115 may be computed from other data 115 obtained directly from a data collector 110. In any event, in the block 510, collected data 115 obtained by the computer 105 may include a distance of the vehicle 101 from other vehicles and/or objects, including a curb 310, such data 115 being obtained via one or more ultrasonic sensors. Collected data 115 obtained via an ultrasonic sensor data collector 110 may also include an azimuth angle of an object relative to the vehicle, whereby an object such as a curb 310 and/or a potential danger posed by the object may be better identified.

As mentioned above, in addition to data 115 from ultrasonic sensor data collectors 110a, a variety of other data 115 may be obtained, e.g., image data 115 from one or more camera data collectors 110b, data 115 relating to vehicle 101 velocity, direction of travel, yaw rate, and steering angle, e.g., an angle of vehicle 101 wheels 305 with respect to a longitudinal axis of the vehicle 101. Further ultrasonic data 115 may be used to trigger collection and/or analysis of other data 115, e.g., image data 115, in the computer 105. For example, if ultrasonic data 115 indicates that an object may be near the vehicle 101 and/or a possible collision risk, then the computer 105 may be programmed to obtain and analyze image data 115 relating to the potential object, e.g., so that the image 115 can be used to classify the object, e.g., as a curb 310, as discussed further below.

Following the block 510, in a block 515, the computer 105 generates, or in the case of a second or later iteration of the process 500, updates, a virtual map, discussed further below with respect to the block 515, of the vehicle 101 surroundings. For example, a map update may be performed substantially continuously, e.g., after a predetermined amount of time, e.g., 100 milliseconds, has elapsed since the virtual map was last updated, or, an amount of time that data 115 has been collected, in the case of a first iteration of the process 500. The virtual map may store a vehicle 101 location, a vehicle 101 speed, an orientation of certain vehicle 101 components, e.g., an angle of wheels 305, a previously undetected object is identified, etc.

A virtual map of the vehicle 101 surroundings such as is generated or updated in the block 515 generally includes a three-dimensional coordinate system having an origin located with reference to the vehicle 101, e.g., at an intersection of horizontal, longitudinal, and vertical axes of the vehicle 101. Further, the virtual map generally includes an identification and location of objects, including possibly a curb 310, around the vehicle 101. For example, ultrasonic sensor data collectors 110 may provide data 115 relating to a distance and/or azimuth angle of a detected object for determining an object identity and/or location. Further, data 115 from one or more ultrasonic sensors 110 may be used in combination with data 115 from other data collectors 110, e.g., image data 115 from a vehicle 101 camera 110.

For example, ultrasonic sensor data 115 could indicate a likely presence of an object with respect to a vehicle 101, whereupon image data 115 could be used, based on image recognition techniques, to confirm and/or augment identification of the object, e.g., using known image classification techniques. For example, image data 115 could be used to determine whether an object is a potential hazard or needs further analysis, e.g., a curb 310 generally requires analysis, whereas a crack in pavement does not. Further, image classification can be used to provide information about a target object, e.g., if the target object is a curb 310, then the computer 105 may be programmed to assume a specified height, i.e., distance of a top edge or surface of the object from the ground, for the object, e.g., 10 centimeters. Likewise, analysis of an image 115 can provide information about a location of the object with respect to a vehicle 101, e.g., whether a curb 310 extends an entire length of the vehicle 101, whether a height of the curb 310 varies, etc. In general, image data 115 in combination with ultrasonic data 115 could be used to better improve determination of an object's location in three-dimensional space. Further in general, with respect to generating and/or updating the virtual map, image data 115 could be used to determine distances, azimuth angles, object identities and/or locations, etc., in addition, or as an alternative, to use of ultrasonic sensor data 110.

As just mentioned, use of image data 115, whether alone or in combination with ultrasonic sensor data 115, includes image processing techniques to analyze images from one or more cameras 110b mounted on a side of a vehicle 101. The images may include a curb 310, whereupon image processing techniques, e.g., known techniques for analyzing images and recognizing objects depicted therein, may be used to identify one or more points of the curb 310. A mathematical model may be generated that fits detected curb 310 locations to a curve, whereby a distance of a wheel 305 from the curb 310 may be estimated, and/or a risk of damage to a wheel 305 or other vehicle 101 component, such as a tire, trim, etc., may be estimated, e.g., based on the determined distance of a wheel 305 from the curb 310, historical data 115 relating to a vehicle 101 impacting a curb 310, dynamic data 115 relating to the vehicle 101, e.g., steering angle, speed, acceleration/deceleration, etc. Also, a driver model may be used, e.g., to indicate likely driver reaction and response times with respect to the curb 310.

Further, sub-processes 1200 and 1300, described below with respect to FIGS. 12 and 13, further illustrate determinations that the computer 105 may make, using data 115, to determine a distance of an object such as a curb from the vehicle 101.

Following the block 515, in a block 520, the computer 105 generates and/or updates the display 400 based on collected data 115 and/or the virtual map. For example, data 115 relating to a vehicle 101 position with respect to a curb 310 may be combined with data 115 relating to an angle of vehicle 101 wheels with respect to a longitudinal axis of the vehicle 101 and/or with respect to the curb 310. Alternatively or additionally, vehicle 101 velocity data 115 may be used in combination with data 115 in this example. That is, if data 115 indicates that vehicle 101 wheels 305 are turned at or above a predetermined angle, possibly in combination with a predetermined velocity, and/or are within a predetermined proximity of a curb 310, then a wheel representation 405 and/or an area 410 proximate to a wheel 305 could be highlighted in the display 400. Further, the display 400 could show a line 420 or the like indicating a shortest distance between a part of the vehicle 101, e.g., a wheel 305 represented by a wheel representation 405, and a curb 310, represented by a curb representation 415. Moreover, other data 115, e.g., data 115 relating to vehicle 101 yaw rate, could be used in combination with some or all of the foregoing.

Following the block 520, in a block 525, the computer 105 determines whether collected data 115, including the virtual map, indicate a potential danger or risk to the vehicle 101 warranting an alert or action. For example, a curb 310 may present a risk to the vehicle 101 if the curb 310 has a height greater than a certain height, the curb 310 is within a certain distance of the vehicle 101, vehicle 101 wheels are turned at or more than a predetermined angle, and/or the vehicle 101 is traveling at or greater than a predetermined velocity, etc. In that case, various elements of the display 400 may be configured as mentioned above with respect to the block 515, e.g., a wheel representation 405, an area 410, and/or a curb representation 415, etc. could be highlighted in the display 400. Alternatively or additionally, it may be desirable to provide an alert via the HMI 120, and/or for the computer 105 to provide an instruction to a vehicle 101 controller.

Table 1 below illustrates one exemplary mechanism for determining risk posed to a vehicle 101 by a curb 310. As can be seen in Table 1, the computer 105 could receive as inputs an estimated curb height, possibly simply a range of "low" or "high," or possibly a more specific estimate, e.g., from e.g., one or both of the processes 1200, 1300 described below, and a distance from a curb 310 of a wheel 105, e.g., determined as described above and/or as described below as part of one or both of the processes 1200, 1300. From these inputs, the computer 105 may provide outputs including an estimated time to collision (TTC) of a wheel 305 with a curb 310, and/or, as indicated by the "X" in the right-most three columns of Table 1, could provide a display showing a possible collision, and alert, e.g., a chime, buzzing, visual display on a heads up display or the like, etc., and/or could exert a control action, such as braking the vehicle 101.

TABLE 1

| Inputs | | Outputs | | | |
|---|---|---|---|---|---|
| Curb Height | Distance Wheel-Curb | TTC Wheel-Curb | Display | Curb Alert | Brake |
| Low/High | <50 cm |  | X |  |  |
| Low | <15 cm | <2 s | X | X |  |
| High | <15 cm | <2 s | X | X |  |
| High | <5 cm | <1 s | X |  | X |

In any event, if it is determined to provide an alert and/or take some action, the block 530 is executed next. Otherwise, the process 500 proceeds to a block 535.

In the block 530, the computer 105 provides an alert and/or provides an instruction to a vehicle 101 controller related to a detected risk. For example, in a case where a sharp, e.g., greater than 20 degrees, 30 degrees, etc. steering angle possibly in combination with a velocity greater than a predetermined velocity, may cause a vehicle wheel 305 to strike a curb 310 in a manner that may cause damage to the wheel 305 and/or other vehicle 101 components, the computer 105 may provide an alert. The alert may be in the form of an audio alert, e.g., a chime, buzzing or some other noise, a haptic alert, e.g., a vibration of the vehicle 101 steering wheel, a blinking light or other indication on a heads up display (HUD) or the like included in the HMI 120, etc. Alternatively or additionally, the computer 105, upon a detected risk, may provide an instruction to a controller in the vehicle 101, e.g., to limit a vehicle 101 steering angle, speed, direction of travel, etc., based on an object indicated in the virtual map.

In addition to simply providing an alert indicating that a risk was present, the HMI 120 could further be used to provide information concerning the nature of the risk. For example, a volume and/or duration of chimes could be varied to indicate greater risks by higher volume and/or greater repetition of chimes. Likewise, the display 400 provides information concerning the nature of a risk as described above. Yet further alternatively or additionally, the HMI, e.g., in the display 400 could provide textual messages, e.g., "Risk of damage to right front tire," etc. The HMI 120 could yet further be used to provide suggestions, e.g., "To avoid tire damage, reduce steering angle and/or velocity," using an audio message, a textual message in the display 400, etc.

Further, the HMI 120 could be configured to provide image data 115 obtained by one or more camera data collectors 110 relating to a risk posed by an obstacle such as a curb 310. For example, a side-mounted camera could be used to provide a still or moving image of a wheel 305 proximate to a curb 310. Upon a determination that an angle of the wheel 305 and/or a proximity of the curb 310 pose a risk of damaging the wheel 305 by striking the curb 310.

Note that thresholds for providing indications of possible risk, e.g., as described with respect to the blocks 520, 530, may be adjusted, e.g., according to a time of day, a time of year, geographic region (e.g., urban or rural, country or region where parking is being performed, etc.), driver input, etc. for example, a distance threshold of a vehicle 101 from a curb 310 that may be used in combination with other data 115 to trigger an indication in the display 400 and/or an alert or action, may be lower during non-daylight hours than during daylight hours.

Following either of the blocks 525, 530, in a block 535, the computer 105 determines whether the process 500 should continue. For example, if the computer 105 is powered off, an operator has provided input to cease collecting data 115 relating to an operator state and/or to cease modifying vehicle 101 operations based thereon, etc., the process 500 may end. If such determination is not made, the process 500 returns to the block 510.

Figures 12, 13:
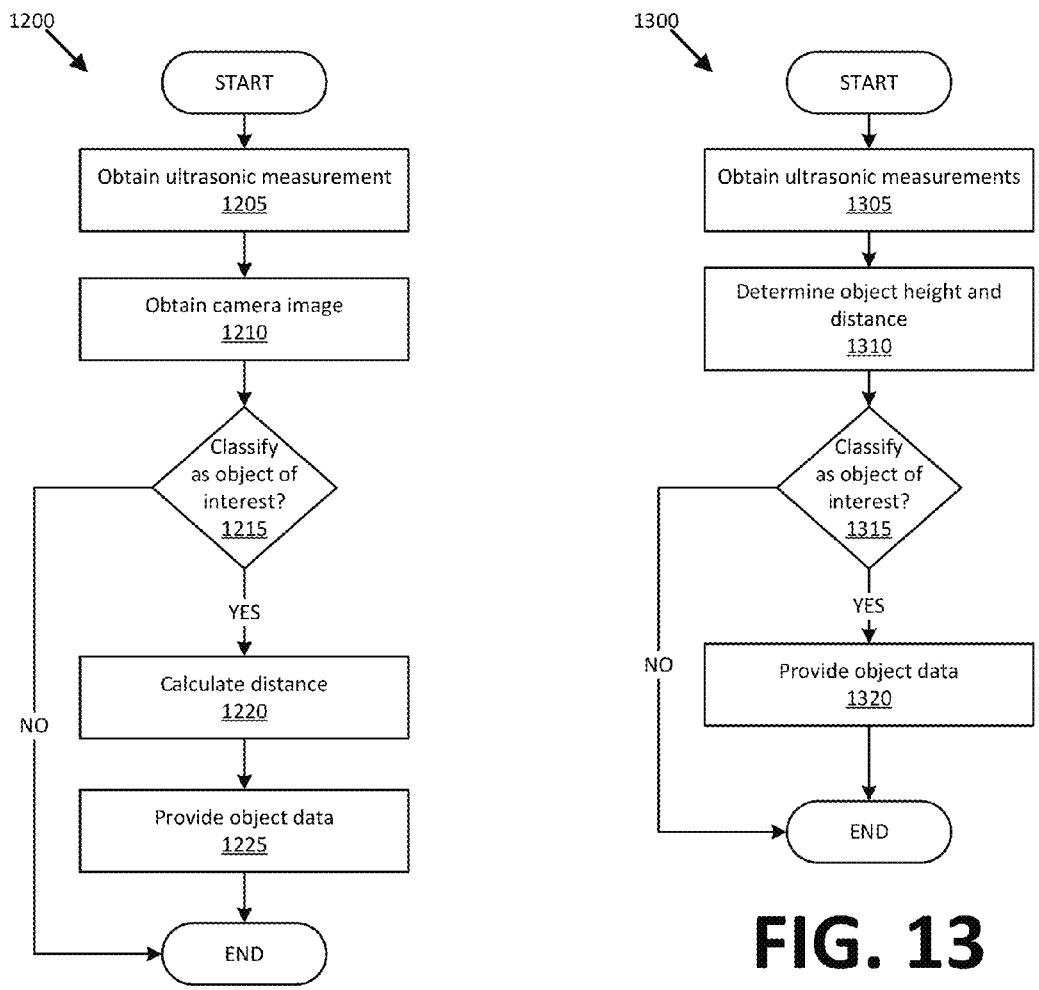
FIG. 12 illustrates an exemplary process for determining the distance of an object such as a curb from a vehicle.
FIG. 13 illustrates another exemplary process for determining the distance of an object such as a curb from a vehicle.

FIG. 12 illustrates an exemplary process 1200 for determining the distance of an object such as a curb from a vehicle 101. The process 1200 is also described with respect to FIG. 10, a block diagram illustrating use of an ultrasonic sensor 110a and a camera 110b to determine a distance of a vehicle 101 from a curb.

Figure 10:
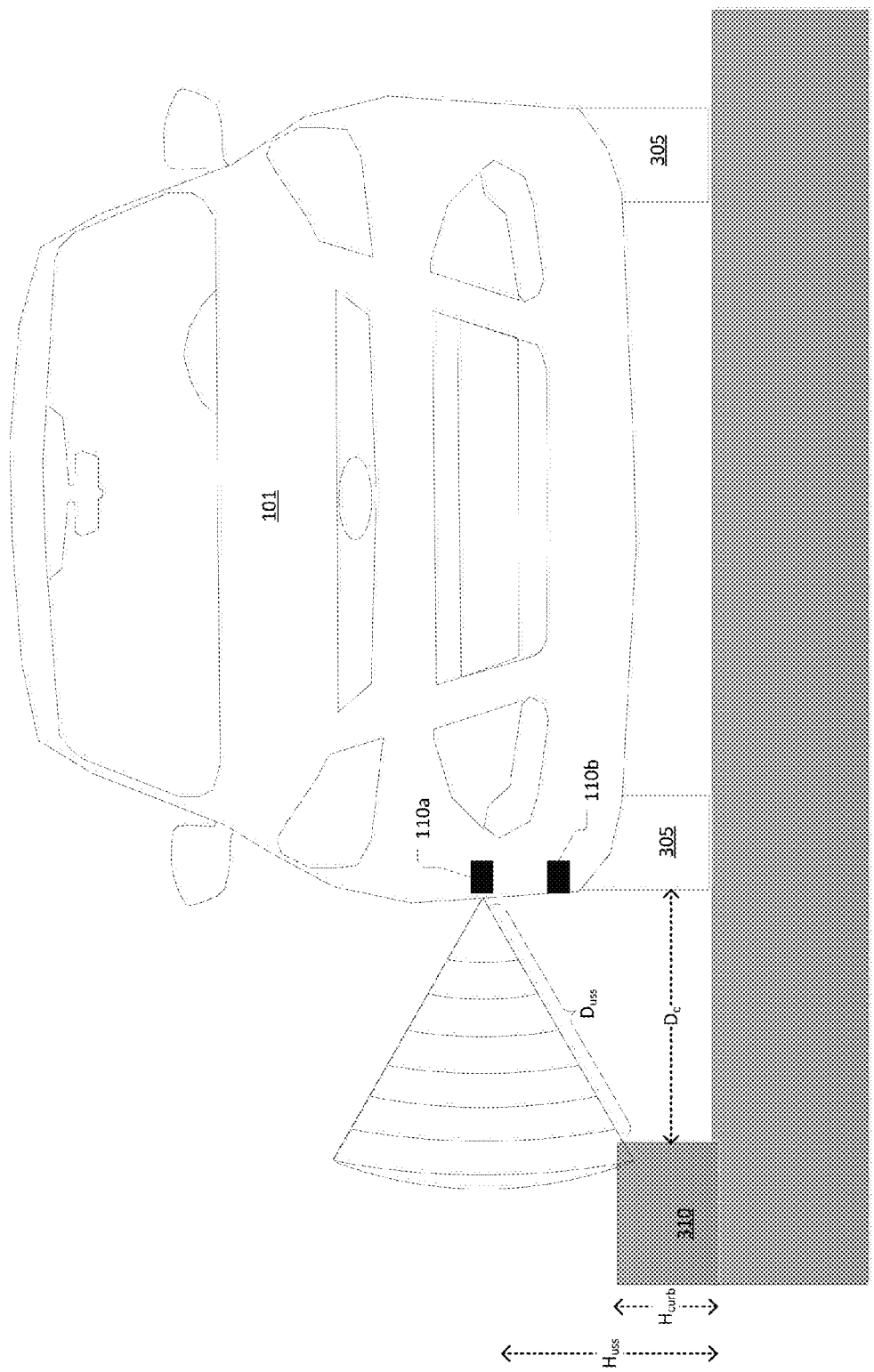
FIG. 10 is a block diagram illustrating use of an ultrasonic sensor and a camera to determine a distance of a vehicle from a curb.

The process 1200 begins in a block 1205, in which an ultrasonic sensor 110a detects an object at a distance from the vehicle 101, e.g., as seen in FIG. 10, an object could be detected at a distance from the vehicle 101 $D_{USS}$.

Next, in a block 1210, a camera 110b provides to the computer 105 an image 115 including a field of view of the ultrasonic sensor 110a.

Next, in a block 1215, the computer 105 then analyzes the image 115 to attempt to classify one or more objects in the image data 115, e.g., using known classification techniques. If the computer 115 is able to classify an object in the image, e.g., as a curb, or as some other object of interest, then a block 1220 is executed next. Otherwise, the process 1200 ends.

In the block 1220, using a known height $H_{USS}$ of the ultrasonic sensor 110a, i.e., the ultrasonic sensor 110 is generally installed in the vehicle 101 at a specified height $H_{USS}$, along with the measured distance $D_{USS}$, a horizontal distance $D_c$ of the vehicle 101 from the classified object, e.g., a curb 310, may be determined in the computer 105 according to the Pythagorean theorem. Note that a "horizontal distance" as that term is used herein is generally a shortest distance between the vehicle 101 and an object.

Next, in a block 1225, the distance $D_c$ may be used in a display 400 or the like, and/or to provide warnings, e.g., as described above with respect to FIG. 5.

Following either the block 1215 or the block 1225, the process 1200 ends.

FIG. 13 illustrates an exemplary process 1300 for determining the distance of an object such as a curb from a vehicle 101. The process 1300 is also described with respect to FIG. 11, a block diagram illustrating use of two ultrasonic sensors 110a to determine a distance of a vehicle from a curb. Note that FIG. 11 and the following explanation assumes that the ultrasonic sensors of the vehicle 101 and the object are at a same longitudinal position. If the object is offset to the front or rear, then it will bill be understood that, instead of the two-dimensional analysis of FIG. 11, a three-dimensional analysis, i.e., using data 115 obtained over time and compensating for offset, may be needed.

Figure 11:
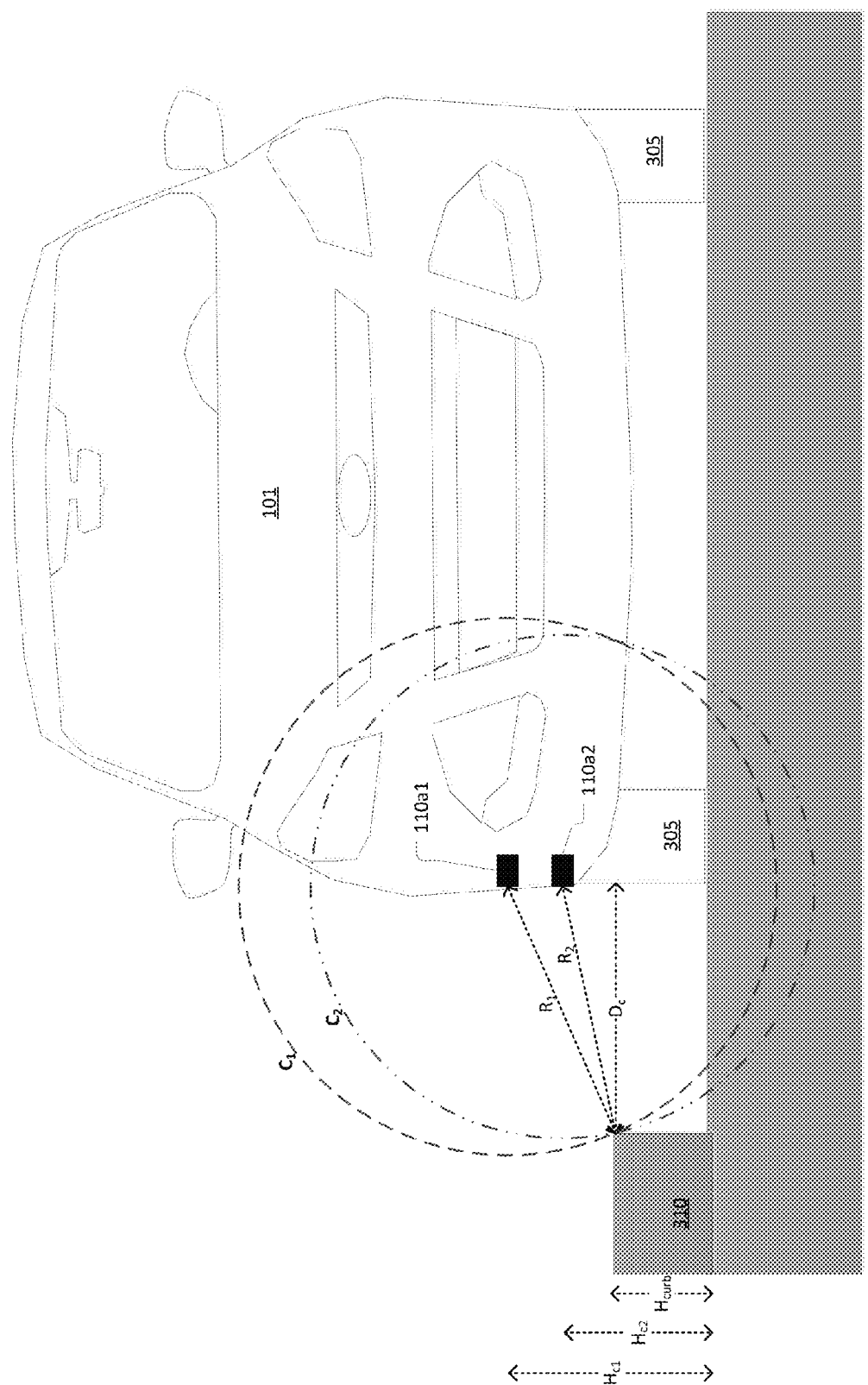
FIG. 11 is a block diagram illustrating use of two ultrasonic sensors to determine a distance of a vehicle from a curb.

The process 1300 begins in a block 1305, in which first and second ultrasonic sensors $110a_1$, $110a_2$, located on a side of a vehicle 101 at respective predetermined heights $H_1$ and $H_2$, each obtain measurements of a distance of an object, e.g., a curb 310, from the vehicle 101. For example, as seen in FIG. 11, a first ultrasonic sensor $110a_1$ may obtain a distance measurement $R_1$, and a second ultrasonic sensor $110a_2$ may obtain a distance measurement $R_2$.

Next, in a block 1310, the computer 105 uses the distance measurements from the ultrasonic sensors $110a_1$, $110a_2$ to determine a height and a distance of a detected object from the vehicle 101. For example, the distances $R_1$, $R_2$ may be, respectively, used as radii to create circles $C_1$, $C_2$ having respective centers at or about the ultrasonic sensors, whereby the centers are at the predetermined heights $H_1$ and $H_2$. As is axiomatic in Euclidean geometry, circles having different centers can intersect each other in at most two points. Further, the computer 105 may be programmed to assume that the circles $C_1$, $C_2$ will intersect each other in two points, and moreover, to assume that one of these points is outside a field of view of the ultrasonic sensors $110a_1$, $110a_2$. Accordingly, the computer 105 may be programmed to determine, for selected point at the distances $R_1$, $R_2$ from the sensors $110a_1$, $110a_2$, both a height, e.g., a curb height $H_{curb}$, and a horizontal distance $D_c$ of a point on an object of interest, e.g., a curb, from the vehicle 101. For example, based on the Pythagorean theorem, the following equations may be used to solve for the two unknowns $D_c$ and $H_{curb}$.

$$D_c^2 = R_1 - (H_{c1} - H_{curb})^2;$$

$$D_c^2 = R_2 - (H_{c2} - H_{curb})^2.$$

In a block 1315, which follows the block 1310, the computer 105 determines whether an object of interest, e.g., a curb 310, has been detected. For example, if one or both of the values $D_c$, $H_{curb}$ are within a predetermined ranges, e.g., an object that is between six and 14 centimeters high may be likely to be a curb 310, an object may need to be less than a predetermined distance, e.g., two meters, from a vehicle 101 to be classified as an object of interest, etc., then the object may be classified as an object of interest. If the object is not an object of interest, then the process 1300 ends. Otherwise, the process 1300 proceeds to a block 1320.

In the block 1320, the computer 105 causes data relating to the detected object, e.g., a classification of the object as a curb 310 or the like, along with the horizontal distance $D_c$ and height $H_{curb}$ associated with the curb, to be used in a warning or alert, e.g., in the display 400 or the like or via an HMI in the vehicle 101 as discussed above.

Following either the block 1315 or 1320, the process 1300 ends.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

As used herein, the adverb "substantially" modifying an adjective means that a structure or process may deviate from an exact described geometry, shape, timing, etc., because of imperfections in materials, machining, manufacturing, processing and/or processing speeds, network connectivity, etc.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer in a vehicle, the computer comprising a processor and a memory, wherein the computer is programmed to:
   collect data including at least a first distance measurement by a first ultrasonic sensor and a second distance measurement by a second ultrasonic sensor related to an object during a parking operation;
   determine a height of the object and determine a horizontal distance of the object from the vehicle based at least in part on the first distance measurement, the second distance measurement, a specified height on the vehicle of the first ultrasonic sensor, and a specified height on the vehicle of the second ultrasonic sensor;
   use the data to generate a virtual map of the object with respect to the vehicle; and
   provide output based on the virtual map that indicates a risk of the parking operation.

2. The system of claim 1, wherein the data includes an image, wherein the computer is further programmed to:
   classify the object using the image and determine three-dimensional coordinates of the object with respect to the vehicle based at least in part on the classification.

3. The system of claim 1, wherein the collected data includes global positioning system (GPS) data, vehicle speed data, and vehicle steering angle data.

4. The system of claim 1, wherein the output indicates the risk in relation to a representation of a component of the vehicle.

5. The system of claim 1, wherein the computer is further programmed to provide, based on the risk, an instruction to a vehicle controller to take an action.

6. The system of claim 1, wherein the computer is further programmed to identify the parking operation based on the collected data.

7. A system, comprising a computer in a vehicle, the computer comprising a processor and a memory, wherein the computer is programmed to:
   collect data related to an object, wherein the data includes at least a first distance measurement by a first ultrasonic sensor and a second distance measurement by a second ultrasonic sensor;
   identify a parking operation based on the data;
   determine a height of the object and determine a horizontal distance of the object from the vehicle based at least in part on the first distance measurement, the second distance measurement, a specified height on the vehicle of the first ultrasonic sensor, and a specified height on the vehicle of the second ultrasonic sensor;
   use the data to generate a virtual map of the object with respect to the vehicle; and
   provide output based on the virtual map that indicates a risk of the parking operation.

8. The system of claim 7, wherein the data includes at least one of an image, global positioning system (GPS) data, vehicle speed data, and vehicle steering angle data.

9. The system of claim 7, wherein the output indicates the risk in relation to a representation of a component of the vehicle.

10. The system of claim 7, wherein the computer is further programmed to provide, based on the risk, an instruction to a vehicle controller to take an action.

11. A method, carried out according to instructions stored in a computer in a vehicle, comprising:
    collecting data including at least a first distance measurement by a first ultrasonic sensor and a second distance measurement by a second ultrasonic sensor related to an object during a parking operation;
    determining a height of the object and determining a horizontal distance of the object from the vehicle based at least in part on the first distance measurement, the second distance measurement, a specified height on the vehicle of the first ultrasonic sensor, and a specified height on the vehicle of the second ultrasonic sensor;
    using the data to generate a virtual map of the object with respect to the vehicle; and
    provide output based on the virtual map that indicates a risk of the parking operation.

12. The method of claim 11, wherein the data includes an image, the method further comprising:
    classify the object using the image and determine three-dimensional coordinates of the object with respect to the vehicle based at least in part on the classification.

13. The method of claim 11, wherein the collected data includes global positioning system (GPS) data, vehicle speed data, and vehicle steering angle data.

14. The method of claim 11, further comprising indicating the risk in relation to a representation of a component of the vehicle.

15. The method of claim 11, further comprising providing, based on the risk, an instruction to a vehicle controller to take an action.

16. The method of claim 11, further comprising identifying the parking operation based on the collected data.

* * * * *